Patented Feb. 5, 1952

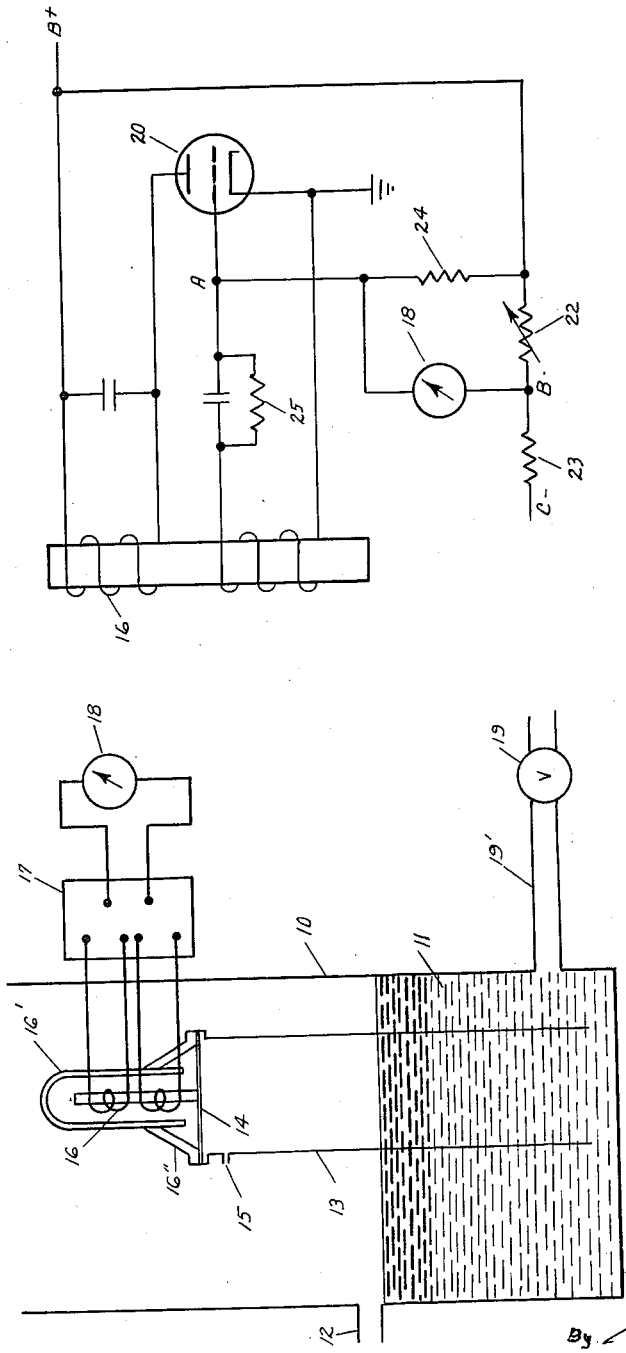

2,584,128

UNITED STATES PATENT OFFICE 2,584,128

LIQUID LEVEL INDICATING APPARATUS

Joseph M. Hildyard, United States Army,
Arlington County, Va.

Application July 3, 1946, Serial No. 681,274

2 Claims. (Cl. 250—36)

(Granted under the act of March 3, 1883, as
amended April 30, 1928; 370 O. G. 757)

The invention described herein may be manufactured and used by or for the Government for governmental purposes, without the payment of any royalty thereon.

This invention is in electrical apparatus and more specifically in electronic fluid level controls.

The principal object of this invention is to provide a novel means for determining the level of a fluid in a vessel.

Another object is to provide means for maintaining a desired fluid level.

Other objects will be apparent from a reading of the following specification and claims.

In the drawings:

Figure 1 is a diagrammatic illustration of my invention;

Figure 2 is a schematic diagram of the oscillator used in my invention; and

Figure 3 shows a modification of my invention.

Referring to the drawings and particularly to Figure 1, 10 is a tank containing a fluid 11 and having an inlet 12. A pipe 13, closed by a diaphragm 14 at its upper end, is placed in fluid 11. A vent is provided at 15 so that the fluid level in pipe 13 may be the same as the level in vessel 10.

The diaphragm is to be vibrated or flexed, and for this purpose there are provided a coil 16, similar to that used in a loudspeaker, a magnet 16' supported adjacent the top of the pipe in any convenient fashion, as by brackets 16'', and an oscillator 17 (see Figure 2). A meter 18 in the oscillator circuit (calibrated in centimeters, feet, or some similar units) is used to determine the level of fluid 11. Valve 19 is provided to draw off the fluid 11 through outlet 19'.

With the fluid 11 closing one end and the diaphragm 14 closing the other end, pipe 13 is a resonant closed pipe. There will be one fluid level at which the pipe will be in resonance with a signal from oscillator 17 transmitted to the pipe by diaphragm 14. At resonance, the waves reflected by the surface of fluid 11 will be in phase with those transmitted by diaphragm 14 and thus the load presented to the oscillator 17 will be at a minimum. It follows then that any other fluid level pipe 13 will be out of resonance with oscillator 17 (its frequency remaining constant) and, therefore, will present a greater load to it than when the pipe and oscillator are in resonance.

Referring to Figure 2, it can be seen that coil 16 is connected to the plate circuit of triode 20, and thus any reaction presented to it by the reflected waves directly affects the plate load.

According to the preferred mode of practicing my invention, the normal fluid level of tank 10 is much higher than that required for a state of resonance between pipe 13 of Figure 1 and oscillator 17. In practice, the fluid level in the tank is raised to the desired point, whereupon potentiometer 22 of bridge circuit 22, 23, 24, and 25 (Figure 2) is adjusted so that points A and B are at the same potential.

With points A and B at the same potential, no current flow will be registered by meter 18, in shunt with resistor 23 and potentiometer 22. A change of potential at either of the points A or B will result in a current flow through the parallel paths which include meter 18, resistor 24, and potentiometer 22. By noting the direction of pointer deflection of the meter, it can be determined whether the level of the tank is above or below that desired. For example, if the fluid level in tank 10 is above the desired point, the loading of the oscillator circuit in Figure 2 will be greater. Since the grid bias of the oscillator diminishes with increased loading, point A thereupon becomes less negative with respect to B and current flows from A through meter 18 to B, causing a deflection of the indicator in one direction. Contrary conditions will, of course, produce an opposite deflection. By properly calibrating the meter, it can be determined how much above the desired level the liquid is.

Figure 3 illustrates one way in which the apparatus of my invention may be applied to maintain the level of a fluid in a vessel. The structure should be assumed to be identical with that of Figure 1, and, thus, servo system 30 is shown as being substituted for meter 18 of Figure 1, oscillator 17 being identical with the oscillator of Figure 1, and the other elements of Figure 1 being assumed to be present although not shown in Figure 3. Servo system 30 is, of course, sensitive to the frequency of the output of oscillator 17 and serves to open or close valve 31, controlling the flow of fluid into the tank through pipe 12.

It will be understood that the diaphragm 14 can be replaced by any of several structures capable of performing the dual functions of transmitting vibrations to the fluid surface and receiving vibrations reflected therefrom (piezoelectric crystals and magnetostrictive elements, for example), and further that driving means other than a coil and magnet can readily be used.

The foregoing description is in specific terms. For the true scope of the invention, reference should be had to the appended claims.

I claim:

1. In an apparatus of the nature described, a pipe extending downwardly into a body of liquid and communicating at the lower end therewith, an oscillator including an electron tube having a plate circuit, a vibrating device adjacent the upper end of said pipe, a magnet adjacent said vibrating device, an armature operatively related to said virbrating device and partly within the field of said magnet, a winding within the field of said magnet energizable by said oscillator for varying the flux of said magnet to drive said armature and thereby said vibrating device, and a second winding within the said field of said magnet said second winding being arranged within the plate circuit of said tube.

2. In an apparatus of the nature described a pipe extending downwardly into a body of liquid and communicating at its lower end therewith, an oscillator including an electron tube having a plate circuit, a vibrating device within said pipe adjacent the upper end thereof, a magnet adjacent said vibrating device, an armature operatively related to said vibrating device and partly within the field of said magnet, a winding within the field of said magnet energizable by said oscillator for varying the flux of said magnet to drive said armature and thereby said vibrating device, and a second winding within the said field of said magnet said second winding being arranged within the plate circuit of said tube.

JOSEPH M. HILDYARD.

REFERENCES CITED

The following references are of record in the file of this patent:

UNITED STATES PATENTS

| Number | Name | Date |
|---|---|---|
| 1,570,781 | Ruben | Jan. 26, 1926 |
| 1,882,395 | Pierce | Oct. 11, 1932 |
| 2,047,974 | Lehr et al. | July 21, 1936 |
| 2,156,519 | Walker | May 2, 1939 |
| 2,244,484 | Beers | June 3, 1941 |
| 2,323,128 | Hare | June 29, 1943 |
| 2,431,233 | Erwin | Nov. 18, 1947 |
| 2,433,599 | Cohen | Dec. 30, 1947 |
| 2,472,249 | De Giers | June 7, 1949 |

FOREIGN PATENTS

| Number | Country | Date |
|---|---|---|
| 171,988 | Great Britain | Aug. 24, 1922 |

OTHER REFERENCES

"A New Method of Gas Analysis" by R. Gerberth, Industrial and Engineering Chemistry, December 1923, p. 1277.